R. WILES.
ELECTRIC COOKER AND TOASTER.
APPLICATION FILED JAN. 21, 1911.

990,617.

Patented Apr. 25, 1911.

2 SHEETS—SHEET 1.

Witnesses:

Inventor:
Russell Wiles

R. WILES.
ELECTRIC COOKER AND TOASTER.
APPLICATION FILED JAN. 21, 1911.
990,617.
Patented Apr. 25, 1911.
2 SHEETS—SHEET 2.
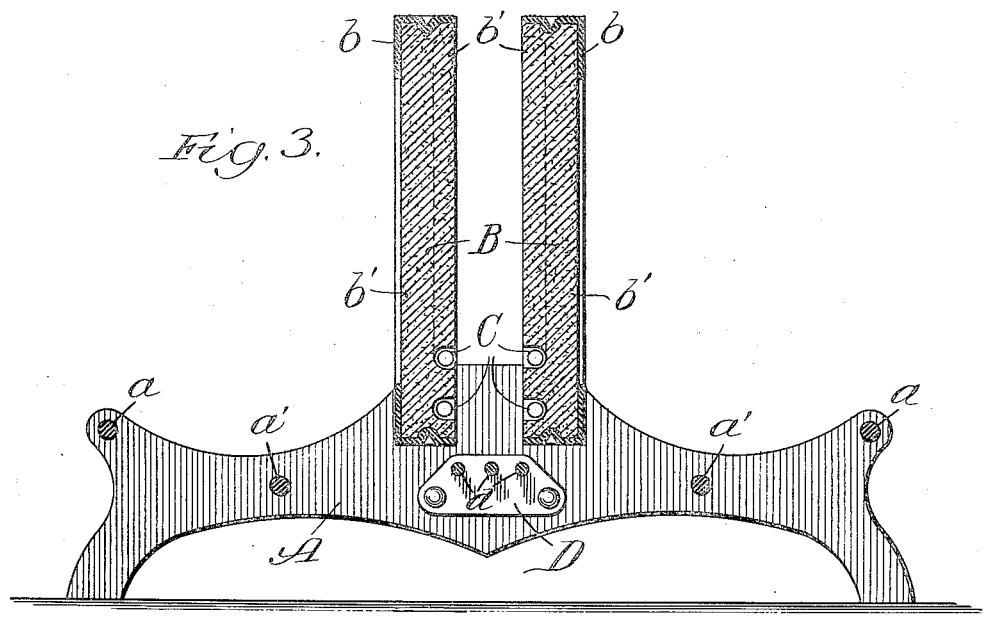
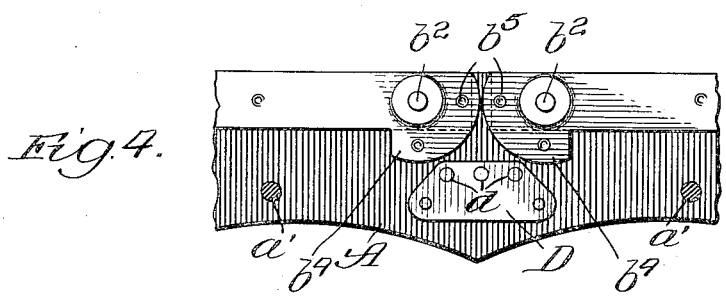
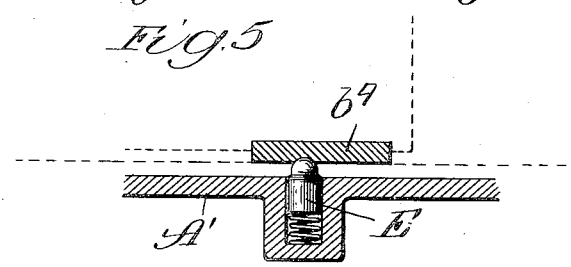
Witnesses:
Inventor:
Russell Wiles,

UNITED STATES PATENT OFFICE.

RUSSELL WILES, OF CHICAGO, ILLINOIS.

ELECTRIC COOKER AND TOASTER.

990,617.  Specification of Letters Patent.  Patented Apr. 25, 1911.

Application filed January 21, 1911. Serial No. 603,848.

*To all whom it may concern:*

Be it known that I, RUSSELL WILES, a citizen of the United States, residing at Chicago, in the county of Cook and State of Illinois, have invented a new and useful Improvement in Electric Cookers and Toasters, of which the following is a specification.

My invention relates to certain new and useful improvements in an electric cooker and toaster, and is fully described and explained in the specification and shown in the accompanying drawings, in which—

Figure 1:
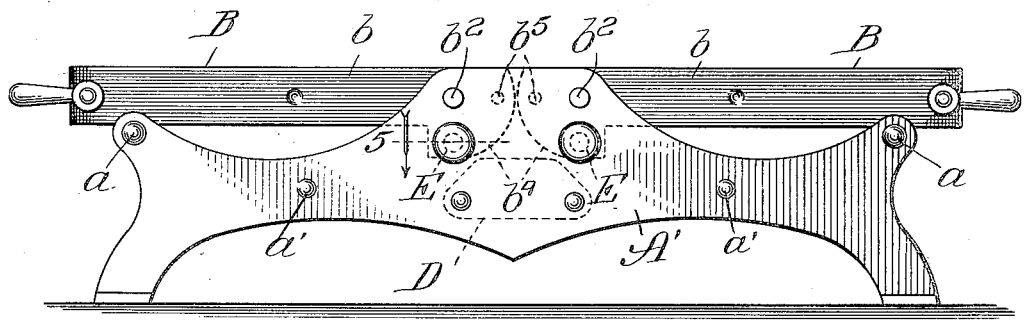
Figure 2:
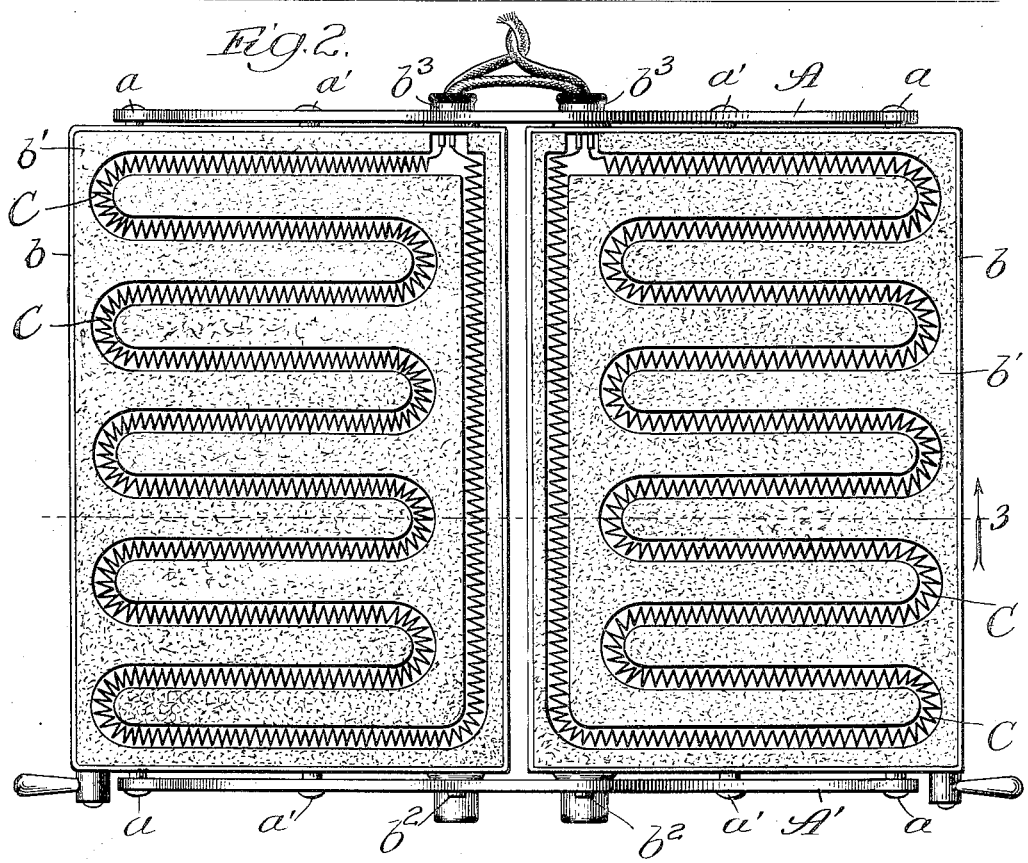

Figure 1 is a side elevation of my improved device; Fig. 2 is a top plan thereof; Fig. 3 is a transverse section on the line 3 of Fig. 2; Fig. 4 is an elevation of part of the ends of the heating elements and Fig. 5 is a horizontal section on the line 5 of Fig. 1.

Referring to the drawings, A, $A^1$ are two end-plates of a suitable shape, the end-plates being connected by longitudinally-extending rods $a$, $a^1$ so that a rigid structure is provided.

B, B are two heating elements, each of which consists of a metallic pan $b$, a refractory filling $b^1$ grooved on its upper surface and heating coils C, C of wire or suitable equivalent resistance device in the grooves. The heating elements B are provided with pivots $b^2$, $b^3$, the pivots $b^2$ passing through the plate $A^1$ of the frame and the pivots $b^3$ passing through the plate A of the frame. The pivots $b^3$ are made hollow and the termini of the heating coils are lead out therethrough in the manner illustrated. It will be noted that the pivots of the heating members are arranged some distance back from the adjacent edges of said members, so that when the members are in their lowered position, which is shown in Fig. 1, the edges will be in juxtaposition but when they are swung up into vertical position, as shown in Fig. 4, the members will be separated. Immediately below the space between the heating members when they occupy their vertical position is a grid D composed of longitudinally-extending rods $d$, the grid being placed as close to the lower corners of the heating members when in their vertical positions as is possible without having the parts strike. For the purpose of holding the heating members in their vertical positions, the end-plate $A^1$ carries two spring-pressed buttons E let into recesses in the end-plate and the pans $b$ of the heating elements have downwardly projecting ears $b^4$ against which said buttons press when the heating elements are in their lowered position, the edges of the pans having depressions $b^5$ which said buttons may enter when the heating elements are in their vertical position for the purpose of holding the same rigidly in position. The heating elements when in their lowered positions rest on the longitudinally-extending bars $a$ of the frame so as to receive firm support therefrom.

I am aware that it has heretofore been proposed to make toasters in which the heating elements stand in a vertical position, the bread to be toasted being likewise placed vertical and close to the heating elements. Such toasters are very efficient but they can be used only for toasting purposes and the heating elements cannot be turned to any other cooking use such as supplying heat to chafing-dishes, coffee-pots and the like. On the other hand cooking devices have been made with the heating elements in a horizontal position. These devices can be used for general cooking purposes and they may likewise be used for the making of toast but in such case, the bread to be toasted necessarily lies flat above the heating element with the result that any crumbs which fall from the piece of bread are burned, thus producing more or less smoke and odor.

The present device is used with its heating elements or members in their horizontal position for ordinary cooking purposes in which case a chafing-dish, coffee-pot or the like, may be placed above it and efficiently and conveniently heated. When it is desired to use the device as a toaster, the heating elements are swung into their vertical position, as shown in Fig. 4, and the piece of bread to be toasted is placed on edge between the heating elements and rests upon the grid. In this way its two sides are simultaneously toasted and the toasting may be very rapid because of the confining of the heat between the two closely-adjacent vertical members.

I am aware that considerable variation is possible in the details of the construction herein set forth. It is considered peculiarly convenient to use two heating elements because when the device is used as a toaster, heat will be applied to both sides of the piece of bread to be toasted at the same time, but it will be evident that a single member could be used so as to toast the bread on one side only or, if desired, the heating elements could be made of the skeleton-form which is now in common use and a piece of bread could be placed upon each of its sides when in a vertical position. However, the form of construction herein shown and described in detail is believed to be the most desirable form of construction and it has therefore been described accurately. It is not, however, intended by such accurate description to limit the invention. Of course, grids of wire or the like, may be placed over the heating elements to prevent the toast from getting too close thereto, in accordance with common practice.

What I claim as new and desire to secure by Letters Patent, is—

1. In a combined toaster and cooker, a base, a heating element having a pivotal support on the base and arranged to swing from a horizontal to vertical position, a resistance-member carried by the heating element, means for conducting current to the resistance-member, the said heating element being adapted to be used as a cooker when in its horizontal position, and as a toaster when in its vertical position, and means for supporting the slice to be toasted in vertical position adjacent to the toasting member when in vertical position.

2. In a combined toaster and cooker, a base, two heating elements pivoted to the base and arranged to be swung from a horizontal position in one plane to parallel vertical position separated to a sufficient extent to permit the insertion of the slice to be toasted, a resistance-member in each heating element, means for conducting current to the resistance-member, and means for supporting the slice to be toasted between the heating elements when in vertical position.

3. In a combined toaster and cooker, a base, two heating elements pivoted to the base and arranged to lie in one plane when lowered, the pivots being back of their adjacent edges so that when swung up they will separate to a sufficient extent to permit the insertion between them of the slice to be toasted, a resistance-member in each element, means for conducting current to the resistance-member, and means for supporting the slice to be toasted between the heating elements when in vertical position.

4. In a combined toaster and cooker, a base, two heating elements pivoted to the base and arranged to swing from a horizontal position in one plane to a parallel vertical position separated to a sufficient extent to permit the insertion between them of the slice to be toasted, a resistance-member in each heating element, means running through one pivot of each heating element for conducting current to the resistance-member and means for supporting the slice to be toasted between the heating elements when in vertical position.

5. In a combined toaster and cooker, a base, two heating elements pivoted to the base and arranged to lie in one plane when lowered, their pivots being back of their adjacent edges so that when swung up they will separate to a sufficient extent to permit the insertion between them of the slice to be toasted, a resistance-member in each heating element, means extending through one pivot of each heating element for conducting current to the resistance-members and means for supporting the slice to be toasted between the heating elements when in vertical position.

6. In a combined toaster and cooker, a base, two heating elements pivoted to the base and arranged to swing from a horizontal position in one plane to parallel vertical position separated to a sufficient extent to permit the insertion between them of the slice to be toasted, a resistance-member in each heating element, means for conducting the current to the resistance-member and a horizontal support for the slice to be toasted between the heating elements when in vertical position.

7. In a combined toaster and cooker, a heating element, means for supporting same alternatively in horizontal cooking or vertical toasting position, and means for supporting the slice to be toasted adjacent to the heating element when the same is in vertical position.

RUSSELL WILES.

In the presence of—
J. G. ANDERSON,
R. A. SCHAEFER.